June 26, 1923.
A. K. HINCHMAN
AIR AND DUST CAP FOR PNEUMATIC TIRES
Filed Jan. 20, 1922
1,460,355
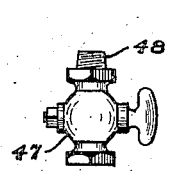
Fig. 8.
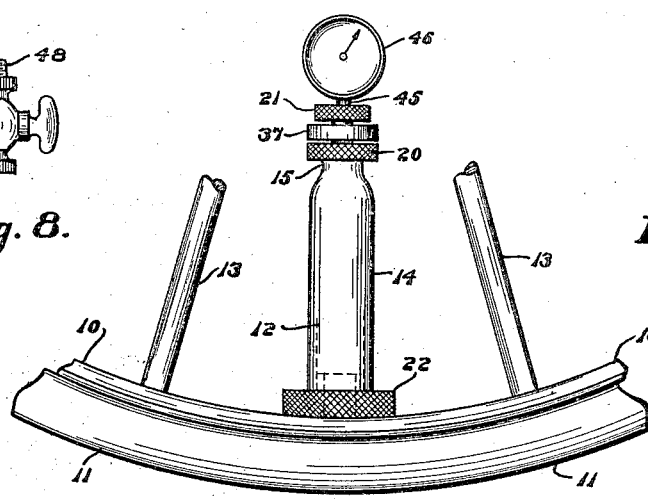
Fig. 1.
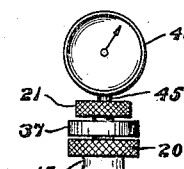
Fig. 9.
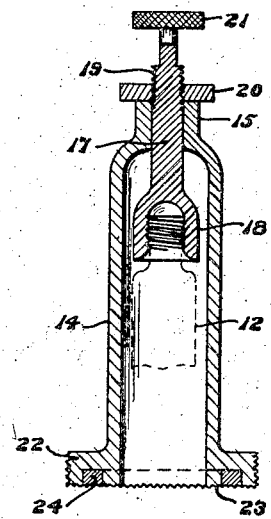
Fig. 2.
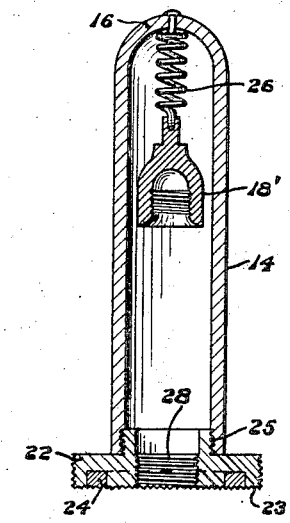
Fig. 3.
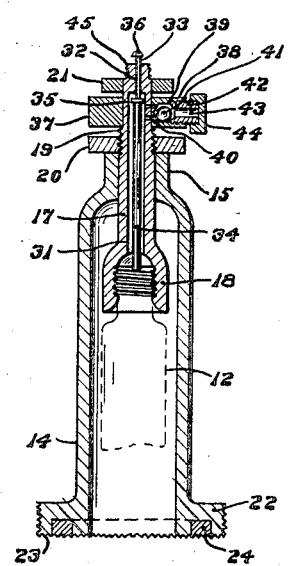
Fig. 4.
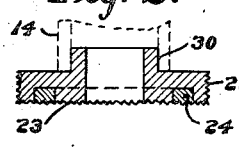
Fig. 5.
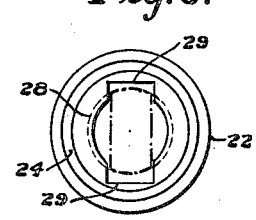
Fig. 6.
Fig. 7.
Alva K. Hinchman
INVENTOR
BY Victor J. Evans
ATTORNEY Patented June 26, 1923.

1,460,355

UNITED STATES PATENT OFFICE.

ALVA K. HINCHMAN, OF PHILADELPHIA, PENNSYLVANIA, ASSIGNOR OF ONE-HALF TO REGINALD M. ADAMS, OF PHILADELPHIA, PENNSYLVANIA.

AIR AND DUST CAP FOR PNEUMATIC TIRES.

Application filed January 20, 1922. Serial No. 530,649.

*To all whom it may concern:*

Be it known that I, ALVA K. HINCHMAN, a citizen of the United States, residing at Philadelphia, in the county of Philadelphia and State of Pennsylvania, have invented new and useful Improvements in Air and Dust Caps for Pneumatic Tires, of which the following is a specification.

This invention relates to valves for pneumatic tires and it has for its primary object to provide a combined air and dust proof cap therefor which is fool-proof, the same being easily applied or removed without the necessity of employing a wrench or other analogous tool.

Another object of this invention is to provide an air and dust cap for pneumatic tires which may be provided with—or without—an air gauge, thereby eliminating the prevailing separate air cap, separate dust cap, and separate gauge and nut.

A further object of this invention is to provide a device of the character outlined above whereby loss of parts is saved and a great deal of labor trouble and the like is entirely done away with.

With the foregoing and other objects in view as will become more apparent from the following description my invention consists essentially in the novel features of construction, combinations and arrangements of parts hereinafter fully described and more particularly defined by the subjoined claims.

In the further disclosure of the invention reference is to be had to the accompanying sheet of explanatory drawings constituting a part of this specification, and in which like characters of reference designate the same or corresponding elements in the several views.

Figure 1 is a fragmentary elevation of a pneumatic tire showing one form of my improved air and dust cap with attached gauge applied to the valve thereof.

Figure 2 is a longitudinal sectional view to an enlarged scale of a slightly modified form of the invention.

Figure 3 is a similar sectional view of another form of my invention.

Figure 4 is an enlarged longitudinal sectional view of the form of my air and dust cap shown by Figure 1 but with the air gauge removed.

Figure 5 is a sectional detail of a lock-nut hereinafter more particularly referred to.

Figure 6 is an underside plan view of the lock-nut shown in Figure 3.

Figure 7 is a section through the valve stem showing the flattened sides thereof for a purpose later on explained.

Figure 8 is an elevation of a cock hereinafter more specifically referred to; and, Figure 9 is a detail of a spiral spring, the use and application whereof will later on be more particularly defined.

Referring more particularly to the views the numeral 10 characterizes a fragmentary part of a vehicle wheel rim, 11 the tire carried thereby and from which extends the usual valve stem 12 by means of which the tire is inflated, whilst a fragmentary part of a pair of the spokes are designated by the numeral 13, all of the aforesaid parts being briefly referred to for a clearer understanding of my invention now to be described.

In carrying out my said invention I employ a main body cap or tubular shell 14 that is formed somewhat elongated as shown, and as will be seen with respect to Figures 1, 2 and 4, it is provided at its upper part with a reduced part or neck 15, whereas in the form illustrated by Figure 3 the upper end is closed in hemispherical fashion at 16.

Slidably fitting within the aforesaid reduced parts or neck portions 15 is a rod or spindle 17 fashioned at its lower end with a bell-like portion 18 and at its upper end screw-threaded at 19 for a part of its length, to receive a knurled nut 20, whilst the extreme upper end is reduced and provided with an integral or attached serrated collar or head piece 21.

According to the forms of my invention shown by Figures 1, 2 and 4 it will be seen that the lower end of the tubular shell 14 is formed with an integral enlarged basal part or flange 22 likewise knurled or milled so as to afford a suitable grip whereby an operator may turn said shell 14 in either direction. Still further it is to be noted that the underface of the flange 22 is provided with a slightly projecting serrated or jagged peripheral edge 23, whilst there is also appropriately bedded therein a leather or other appropriate material concentrically disposed ring 24 for a purpose later on explained. This lower enlarged basal part or flange 22 will be hereinafter referred to as the lock-nut portion of my novel air and dust cap.

In Figure 3 it will be seen that the locknut 22 is made as a separate part from the tubular shell 14 and that it is threaded thereinto by screwed neck portion or shoulder 25. It is also to be noted in connection with this figure that the bell-like portion 18' is supported axially in the tubular shell 14 by an expansible or similar spring 26. Still further by this form of my invention it will be noted that there is provided what may be termed a quick application form for valve stems having flat sides as shown at 27, in Figure 7, in that the lock nut 22 is provided with a threaded bore 28 of the same diameter as that of the valve stem 12 and diametrically cut out rectangular notches 29. Thus it will be readily seen more particularly from Figure 6 that when the valve stem 12 is in the position indicated by the dotted line $a$ in said figure the tubular shell 14 can be readily slipped or slid thereover, whereupon a half turn will result in the locking of the parts smartly together.

In Figure 5 it will be observed that the lock-nut 22 is fitted a friction fit at 30 into the lower end of the tubular shell 14.

Referring once again more specifically to Figure 4 of the drawings it will be seen that the rod or spindle 17 is axially counterbored from the bell-shaped end 18 to provide two borings 31, 32 the latter serving as a bearing for the reduced end 33 of a pin valve 34 of a length to extend downwards into the bell-like portion 18 for a purpose later on explained. A collar 35 and a head 36 are formed on the pin valve 34 to limit its longitudinal movements. Fitted to the aforementioned upper part of the rod or spindle 17 and above the screw-threaded part thereof is a collar 37 having a laterally projecting branch 38 which is bored out at 39— said boring having communication with the aforesaid boring 31 by means of a series of pin holes 40. Disposed within the bored-out part 39 is a ball 41 of rubber or other appropriate material and said ball 41 is retained in place by a screw-plug 42 having a bore 43 and said screw-plug 41 is closed on its outer end by a removable cap 44.

Adapted to be fitted on the outer threaded reduced end 45 of the aforesaid rod or spindle 17 is an air gauge 46 of the Bourdon or like type for indicating the pressure within the inner tube of the tire 11. Or, a cock 47—Figure 8—may be first threaded on the reduced end 45 and then have the gauge 46 attached to the nipple 48 thereof.

Now as I have explained construction and mechanism of my complete self-adjusting universal air and dust devices I will proceed to explain more in detail the use and function of the form shown by Figure 4, said device being intended to do away with valve stems in pneumatic tires for automobiles and the like. It will be noted that this form of device possesses a valve check, automatic stop, air gauge, dust cap, air cap, lock collar, washer and nut all in one, which can be used in connection with the standard valve stems for pneumatic tubes that are now on the market and it is to be here noted that I lay great importance on the fact that the lower bell-shaped end 18 of the rod or spindle 17 is machined and internally screw-threaded so that it will fit the tit of any standard valve stem and by virtue of its peculiar formation is absolutely self-centering.

Now it will be clearly understood that as the rod or spindle 17 is screwed upon the tit of the valve stem 12 the pin valve 34 will be brought in contact with the little pin that is usually inserted in the end of standard pneumatic tire valve stems and thereby force the same downwardly enough so that the valve is moved off its seat in said stem 12. The collar 35 on the pin valve 34 will act as a stop and keep the said pin valve within certain limits of travel when it is pressing against the aforementioned pin in the valve stem.

In order to inflate an inner tube or tire when the device as shown by Figure 4, is mounted or assembled on the valve stem thereof the operator first removes the screw cap 44 thereby exposing the outer part or threaded portion of the screw-plug 42 to which may be attached the air hose or other appropriate connection from a source of air supply, or it will be clearly apparent that the ordinary tube or inflating pump may be similarly connected thereto. Now it will be perfectly clear that the air will enter through the bore 38, pin holes 39 and bore 31 and from thence be forced into the inner tube as required.

From the foregoing description it will be clearly apparent that all that is necessary when attaching my improved air and dust caps to the valve stems 12. the operator first slides the tubular shell or casing 14 over the valve stem 12. The next operation is to release the screwed nut 20 so that the rod or spindle 17 may be forced on to the top end of the threaded tit of the valve stem 12. The operator then grasps the serrated head piece 21 of the rod and with the thumb and first finger thereof screws the bell rod or spindle 17 downwards until the bell-like portion 18 is threaded on to the aforesaid tit thereby ensuring an air-tight joint as between the valve stem 12 and said bell-like portion 18. The next operation is to screw down the knurled nut 20 which will force the locknut 22 into frictional and tight engagement upon the rim 10 of the vehicle wheel thereby making a dust and water-proof joint due to the insertion in said lock-nut of the leather or similar ring 24.

In the form of my invention shown more particularly by Figure 3 it will be understood that the half turn necessary to lock the device in place will similarly result in a partial threading of the bell-like part 18' on to the tit of the valve stem. In some instances instead of using the knurled nut 20 and screw-threaded part 19 I may simply interpose between the reduced part or neck 15 and the serrated head piece 21 a spring 49 of the nature shown by Figure 9 when it will be clearly apparent that after the connection is effected between the bell-like part 18 and the tit of the valve stem, said spring 49 will project the tubular shell 14 into frictional and dust-proof engagement on the wheel rim.

From the foregoing description and an examination of the drawings it will be clearly apparent that by my invention I have provided an extremely simple and efficient device for the purposes set forth, and whilst there has been shown and described various forms thereof the same are not to be too conservatively construed in that it will be apparent that changes in the shape and assembly of the several parts may be readily effected without departing from the spirit of the invention as more particularly defined by the subjoined claims.

Having described my invention, what I claim as new and desire to secure by Letters Patent is:

1. A combined air and dust cap for pneumatic tires comprising a tubular body having an outwardly directed flange at one end, a resilient packing ring concentrically bedded in the face of said flange, a neck portion at the other end of said tubular body, means movble axially in said neck portion for engagement with the tit of the tire valve stem, said means comprising a spindle having an internally threaded bell-shaped inner end, a reduced outer end terminating in a manipulating head, said spindle being screw-threaded for a portion of its length adjoining the reduced outer end, and a lock-nut on said screw-threaded portion whereby the device may be secured dust and damp-proof on the tire rim.

2. A combined air and dust cap for pneumatic tires comprising a tubular body having an outwardly directed flange at one end, a resilient packing ring concentrically bedded in the face of said flange, a neck portion at the other end of said tubular body, means movable axially in said neck portion for engagement with the tit of the tire valve stem, said means comprising a hollow spindle having an internally threaded bell-shaped inner end, a reduced outer end terminating in a manipulating head, said spindle being screw-threaded for a portion of its length adjoining the reduced outer end, and a lock-nut on said screw-threaded portion whereby the device may be secured dust and damp-proof on the tire rim.

3. A combined air and dust cap for pneumatic tires comprising a tubular body having an outwardly directed flange at one end, a resilient packing ring concentrically bedded in the face of said flange, a neck portion at the other end of said tubular body, means movable axially in said neck portion for engagement with the tit of the tire valve stem, said means comprising a hollow spindle having an internally threaded bell-shaped inner end, a reduced outer end terminating in a manipulating head, said spindle being screw-threaded for a portion of its length adjoining the reduced outer end, a lock-nut on said screw-threaded portion whereby the device may be secured dust and damp-proof on the tire rim, and means whereby an air gauge may be attached to the device for indicating the pressure in the pneumatic tire.

4. A combined air and dust cap for pneumatic tires comprising a tubular body having an outwardly directed flange at one end, a resilient packing ring concentrically bedded in the face of said flange, a neck portion at the other end of said tubular body, means movable axially in said neck portion for engagement with the tit of the tire valve stem, said means comprising a hollow spindle having an internally threaded bell-shaped inner end, a reduced outer end terminating in a manipulating head, said spindle being screw-threaded for a portion of its length adjoining the reduced outer end, a lock-nut on said screw-threaded portion whereby the device may be secured dust and damp-proof on the tire rim, and means whereby an air gauge may be attached to the device for indicating the pressure in the pneumatic tire, said means comprising a pin valve axially disposed within the aforesaid hollow spindle.

5. A combined air and dust cap for pneumatic tires comprising a tubular body having an outwardly directed flange at one end, a resilient packing ring concentrically bedded in the face of said flange, a neck portion at the other end of said tubular body, a spindle having an internally threaded bell-shaped inner end for engagement with the tit of the valve stem, said spindle being provided with a reduced outer end terminating in a manipulating head, and a lock-nut having threaded engagement on the aforesaid spindle whereby the tubular body may be forced into damp and dust-proof engagement with the tire rim after the aforesaid bell-shaped end has been engaged on the valve stem tit.

6. A self-adjusting universal air and dust cap for pneumatic tires comprising a tubular body having an outwardly directed flange at one end, a resilient packing ring concentrically bedded in the face of said flange, a neck portion at the other end of said tubular body, means movable axially in said neck portion for engagement with the tit of the tire valve stem, said means comprising a hollow spindle having an internally threaded bell-shaped inner end, a reduced outer end terminating in a manipulating head, said spindle being screw-threaded for a portion of its length adjoining the reduced outer end, a lock-nut on said screw-threaded portion whereby the device may be secured dust and damp-proof on the tire rim, means for depressing the tire valve when an air gauge is attached to the device for indicating the pressure in the pneumatic tire, said means comprising a pin valve axially disposed within the aforesaid hollow spindle, and means whereby an air gauge may be connected to the outer end of said hollow spindle.

In testimony whereof I affix my signature.

ALVA K. HINCHMAN.